(12) United States Patent
Yonesato et al.

(10) Patent No.: US 10,329,163 B2
(45) Date of Patent: Jun. 25, 2019

(54) NICKEL OXIDE MICROPOWDER AND METHOD FOR PRODUCING SAME

(71) Applicant: SUMITOMO METAL MINING CO., LTD., Tokyo (JP)

(72) Inventors: Norimichi Yonesato, Ichikawa (JP); Tai Ito, Niihama (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 0 days.

(21) Appl. No.: 15/704,781

(22) Filed: Sep. 14, 2017

(65) Prior Publication Data

US 2018/0002192 A1  Jan. 4, 2018

Related U.S. Application Data

(62) Division of application No. 14/237,418, filed as application No. PCT/JP2012/070013 on Aug. 6, 2012, now Pat. No. 9,790,099.

(30) Foreign Application Priority Data

Aug. 6, 2011  (JP) .................................. 2011-172437

(51) Int. Cl.
  *B32B 5/16*  (2006.01)
  *C01G 53/00*  (2006.01)
  *C01G 53/04*  (2006.01)

(52) U.S. Cl.
  CPC .......... *C01G 53/04* (2013.01); *C01P 2004/51* (2013.01); *C01P 2004/61* (2013.01); *C01P 2006/12* (2013.01); *C01P 2006/80* (2013.01); *Y10T 428/2982* (2015.01)

(58) Field of Classification Search
  CPC .. C01G 53/04; C01P 2004/51; C01P 2004/61; C01P 2006/12; C01P 2006/80; Y10T 428/2982
  USPC ...................................... 423/594.19; 428/402
  See application file for complete search history.

(56) References Cited

U.S. PATENT DOCUMENTS 2,776,244 A    1/1957  Sowerwine
9,790,099 B2 * 10/2017  Yonesato ............... C01G 53/04

FOREIGN PATENT DOCUMENTS

| CN | 101264942 A | 9/2008 |
|----|-------------|--------|
| JP | 07-010544 A | 1/1995 |
| JP | 2001-032002 A | 2/2001 |
| JP | 2002-198213 A | 7/2002 |
| JP | 2004-123488 A | 4/2004 |
| JP | 2004-189530 A | 7/2004 |
| JP | 2005-002395 A | 1/2005 |
| JP | 2008-156134 A | 7/2008 |
| JP | 2008-266071 A | 11/2008 |
| JP | 2009-155194 A | 7/2009 |
| JP | 2009-298647 A | 12/2009 |
| JP | 2010-089988 A | 4/2010 |
| JP | 2011-042541 A | 3/2011 |
| JP | 2011-157247 A | 8/2011 |
| JP | 2011-225395 A | 11/2011 |

OTHER PUBLICATIONS

Translation JP 2009-155194 (2009).*
International Search Report dated Sep. 4, 2012, issued for PCT/JP2012/070013.
J.B. Yi et al., "Size-dependent magnetism and spin-glass behavior of amorphous NiO bulk, clusters, and nanocrystals: Experiments and first-principles calculations," Physical Review B, col. 76, p. 224402-1-224402-5. (2007).
First Office Action dated Nov. 26, 2014, issued from the State Intellectual Property Office for the Chinese Patent Application No. 201280049116.3.
Extended European Search Report dated Feb. 24, 2015 for corresponding European Application No. EP12822734.5.

* cited by examiner

*Primary Examiner* — Hoa (Holly) Le
(74) *Attorney, Agent, or Firm* — Locke Lord LLP; James E. Armstrong, IV; Nicholas J. DiCeglie, Jr.

(57) ABSTRACT

Disclosed herein are a nickel oxide fine powder that is suitable as a material for electronic parts and has a controlled sulfur content, a low chlorine content, and a fine particle size and a method for industrially and stably producing such a nickel oxide fine powder.
Nickel hydroxide obtained by neutralizing an aqueous nickel sulfate solution with an alkali is heat-treated in a non-reducing atmosphere at a temperature higher than 850° C. but lower than 1050° C. to form nickel oxide particles, and a sintered compact of nickel oxide particles that may be formed during the heat treatment is pulverized by preferably allowing the nickel oxide particles to collide with one another. The thus obtained nickel oxide fine powder has a sulfur content of 400 mass ppm or less, a chlorine content of 50 mass ppm or less, a sodium content of 100 mass ppm or less, and a specific surface area of 3 $m^2/g$ or more but less than 6 $m^2/g$.

2 Claims, No Drawings

NICKEL OXIDE MICROPOWDER AND METHOD FOR PRODUCING SAME

CROSS REFERENCE TO RELATED APPLICATIONS

This Application is a Divisional of U.S. patent application Ser. No. 14/237,418, filed on May 12, 2014, which application is a 371 U.S. National Phase application of International PCT Patent Application No. PCT/JP2012/070013, filed Aug. 6, 2012, which application claims the benefit of priority to Japanese Patent Application No. JP 2011-172437 filed on Aug. 6, 2011. The entire contents of these applications are incorporated herein by reference in their entirety.

TECHNICAL FIELD

The present invention relates to a nickel oxide fine powder and a method for producing the same. More specifically, the present invention relates to a nickel oxide fine powder that has a controlled sulfur content, a low impurity content, especially chlorine content and sodium content, and a fine particle size and is suitable as a material for use in electronic parts or electrodes for solid oxide fuel cells and a method for producing the same.

BACKGROUND ART

In general, a nickel oxide powder is produced by calcining a nickel salt such as nickel sulfate, nickel nitrate, nickel carbonate, or nickel hydroxide or a nickel metal powder in an oxidizing atmosphere with the use of a rotary furnace such as a rotary kiln, a continuous furnace such as a pusher furnace, or a batch furnace such as a burner furnace. Such a nickel oxide powder is used in a variety of applications as a material for use in electronic parts, electrodes for solid oxide fuel cells, or the like.

For example, when widely used as a material for electronic parts, a nickel oxide powder is mixed with other materials such as iron oxide and zinc oxide and then sintered to produce ferrite parts or the like. When a composite metal oxide is formed by reacting two or more materials by sintering a mixture of the materials as in the case of the above-described production of ferrite parts, its formation reaction is limited by the diffusion reaction of a solid phase, and therefore a powder having a fine particle size is generally suitable as a raw material. It is known that the use of such a raw material increases the probability of contact with other materials and the activity of particles so that the reaction uniformly proceeds even by low-temperature and short-time treatment. Therefore, the use of a raw material powder having a fine particle size is an important factor for improving the efficiency of forming a composite metal oxide.

Solid oxide fuel cells are expected to serve as new power generation systems from the aspect of both environment and energy, and a nickel oxide powder is used as an electrode material for such solid oxide fuel cells. In general, a cell stack of a solid oxide fuel cell has a structure in which single cells each having an air electrode, a solid electrolyte, and a fuel electrode are laminated in this order. As the fuel electrode, one obtained by, for example, mixing nickel or nickel oxide and stabilized zirconia as a solid electrolyte is commonly used. In the fuel electrode, nickel oxide is reduced to nickel metal by a fuel gas such as hydrogen or hydrocarbon so that a three-phase boundary between nickel, solid electrolyte, and gap functions as a reaction field for the fuel gas and oxygen during power generation. Therefore, as in the case of the production of ferrite parts, the use of a raw material powder having a fine particle size is an important factor for improving power generation efficiency.

Meanwhile, the specific surface area of a powder is sometimes used as a measure for determining whether the powder has a fine particle size. Further, it is known that the particle size and specific surface area of a powder have a relationship represented by the following calculation formula 1. The relationship represented by the following calculation formula 1 is derived assuming that particles are perfectly spherical, and therefore there is a certain amount of error between a particle size determined by the calculation formula 1 and an actual particle size. However, as can be seen from the calculation formula 1, the larger the specific surface area is, the smaller the particle size is.

$$\text{particle size} = 6/(\text{density} \times \text{specific surface area}) \quad \text{[Calculation Formula 1]}$$

In recent years, there has been a demand for higher-performance ferrite parts, and a nickel oxide powder has come to be used in a wider range of applications such as electronic parts other than ferrite parts, and therefore there has been a demand for a nickel oxide powder having a lower impurity element content. Particularly, among impurity elements, chlorine and sulfur are regarded as elements that are preferably minimized, because there is a case where chlorine and sulfur react with silver used in an electrode so that the electrode is degraded or chlorine and sulfur corrode a sintering furnace.

On the other hand, JP 2002-198213 A (Patent Literature 1) proposes a ferrite material produced from a ferrite powder whose sulfur component content is 300 ppm to 900 ppm in terms of S and chlorine component content is 100 ppm in terms of Cl at the stage of raw material. Patent Literature 1 states that this ferrite material can have a high density even when the ferrite powder is sintered at a low temperature without using any additive, and a ferrite core and a laminated chip component produced from the ferrite material can have excellent moisture resistance and temperature characteristics.

As described above, there is a demand for a nickel oxide powder having lower chlorine and sulfur contents. Further, in the case of a nickel oxide powder for use as a raw material for electronic parts, especially ferrite parts, its sulfur content is required not only to be reduced but also to be strictly controlled to be within a predetermined range. That is, a nickel oxide powder for use as a material for electronic parts is required to have a fine particle size, a lower impurity content, and in addition, a strictly-controlled sulfur content.

As a conventional method for producing such a characteristic nickel oxide powder, a method has been proposed in which nickel sulfate as a raw material is roasted. For example, JP 2001-32002 A (Patent Literature 2) proposes a nickel oxide powder production method in which nickel sulfate as a raw material is subjected to first roasting at a roasting temperature of lower than 950 to 1000° C. and then second roasting at a roasting temperature of 1000 to 1200° C. in an oxidizing atmosphere with the use of a kiln or the like. Patent Literature 2 states that a nickel oxide fine powder having a controlled average particle size and a sulfur content of 50 mass ppm or less can be obtained by this production method.

Further, JP 2004-123488 A (Patent Literature 3) proposes a nickel oxide powder production method in which the step of dehydrating nickel sulfate by calcination at 450 to 600° C. and the step of decomposing nickel sulfate by roasting at 1000 to 1200° C. are clearly separated from each other.

Patent Literature 3 states that a nickel oxide powder having a low sulfur content and a small average particle size can be stably produced by this production method.

Further, JP 2004-189530A (Patent Literature 4) proposes a method in which nickel sulfate is roasted at a maximum temperature of 900 to 1250° C. using a horizontal rotary furnace while air is forcibly introduced into the furnace. Patent Literature 4 states that a nickel oxide powder having a low impurity content and a sulfur content of 500 mass ppm or less can be obtained also by this production method.

However, all the methods disclosed in Patent Literatures 2 to 4 have a drawback that the nickel oxide powder has a coarse particle size when the roasting temperature is increased to reduce its sulfur content and the nickel oxide powder has a high sulfur content when the roasting temperature is decreased to make its particles fine. Therefore, it is difficult to control the particle size and the sulfur content to be their optimum values at the same time. Further, these methods have a problem that a large amount of gas containing SOx is produced during heating and therefore expensive treatment equipment for removing SOx is required.

A nickel oxide fine powder can be synthesized also by a method in which an aqueous solution containing a nickel salt such as nickel sulfate or nickel chloride is neutralized with an alkali such as an aqueous sodium hydroxide solution to crystallize nickel hydroxide and then the nickel hydroxide is roasted. In the case of such a method, the amount of an anion component-derived gas produced by roasting nickel hydroxide is small. Therefore, it is considered that exhaust gas does not need to be treated or can be treated by simple equipment, which makes it possible to produce a nickel oxide fine powder at low cost.

For example, JP 2011-042541 A (Patent Literature 5) proposes a method for obtaining a nickel oxide powder having a low sulfur content, a low chlorine content, and a fine particle size, in which an aqueous nickel chloride solution is neutralized with an alkali to obtain nickel hydroxide, the nickel hydroxide is heat-treated at a temperature of 500 to 800° C. to obtain nickel oxide, and the nickel oxide is slurried and then pulverized and washed at the same time with a wet jet mill.

However, in the case of the nickel oxide powder production method disclosed in Patent Literature 5, since nickel chloride is used as a raw material, a reduction in the sulfur content of a nickel oxide powder can be achieved, but it is difficult to control the sulfur content to be within a predetermined range. Further, since nickel oxide is wet-pulverized, there is a fear that agglomeration occurs during drying. Further, a drying step needs to be performed after pulverizing, which is disadvantageous also in terms of cost.

As describe above, it cannot be said that a nickel oxide powder obtained by such a conventional technique is a satisfactory nickel oxide powder having a fine particle size, a low chlorine content, and a controlled sulfur content, and therefore there has been a demand for further improvement.

CITATION LIST

Patent Literature

Patent Literature 1: JP 2002-198213 A
Patent Literature 2: JP 2001-032002 A
Patent Literature 3: JP 2004-123488 A
Patent Literature 4: JP 2004-189530 A
Patent Literature 5: JP 2011-042541 A

SUMMARY OF INVENTION

Technical Problem

In view of the above problems, it is at object of the present invention to provide a nickel oxide fine powder that contains a controlled trace amount of sulfur, has a low impurity content, especially chlorine content, and a fine particle size, and is suitable as a material for electronic parts or an electrode material for solid oxide fuel cells and to provide a method for producing such a nickel oxide fine powder.

Solution to Problem

In order to achieve the above object, the present inventors have focused attention on and intensively studied a nickel oxide fine powder production method in which nickel hydroxide that is obtained by neutralizing an aqueous nickel salt solution and does not produce a large amount of hazardous gas during heat treatment is roasted, and as a result have found that a nickel oxide fine powder having a controlled sulfur content, a low impurity content, especially chlorine content, and a fine particle size can be obtained by heat-treating, under predetermined conditions, nickel hydroxide obtained by neutralizing an aqueous nickel sulfate solution with an alkali, which has led to the completion of the present invention.

A method for producing a nickel oxide fine powder provided in the present invention includes the steps of neutralizing an aqueous nickel sulfate solution with an alkali to obtain nickel hydroxide; heat-treating the obtained nickel hydroxide in a non-reducing atmosphere at a temperature higher than 850° C. but lower than 1050° C. to form nickel oxide particles; and pulverizing a sintered compact of nickel oxide particles that may be formed during the heat treatment.

The neutralization is preferably performed by controlling a PH of a reaction liquid to be 8.3 to 9.0, and the aqueous nickel sulfate solution preferably has a nickel concentration of 50 to 150 g/L.

Further, the pulverizing is preferably performed by allowing the nickel oxide particles that may contain the sintered compact to collide with one another.

A nickel oxide fine powder provided in the present invention has a specific surface area of 3 $m^2/g$ or more but less than 6 $m^2/g$, a sulfur content of 400 mass ppm or less, a chlorine content of 50 mass ppm or less, and a sodium content of 100 mass ppm or less. Further, the nickel oxide fine powder of the present invention preferably has a D90 of 2 μm or less as measured by a laser scattering method.

Effects of Invention

According to the present invention, it is possible to easily obtain a nickel oxide fine powder that is suitable as a material for electronic parts such as ferrite parts or an electrode material for solid oxide fuel cells and has a controlled sulfur content of 400 mass ppm or less, a low impurity content, i.e., a chlorine content of 50 mass ppm or less and a sodium content of less than 100 mass ppm, and a fine particle size. Further, the method for producing such a nickel oxide fine powder has a very high industrial value because a nickel oxide fine powder can be easily produced without producing a large amount of chlorine or SOx gas.

DESCRIPTION OF EMBODIMENTS

A method for producing a nickel oxide fine powder according to an embodiment of the present invention includes a step A in which an aqueous nickel sulfate solution is neutralized with an alkali to obtain nickel hydroxide, a step B in which the obtained nickel hydroxide is heat-treated in a non-reducing atmosphere at a temperature higher than 850° C. but lower than 1050° C. to form nickel oxide particles, and a step C in which a sintered compact of nickel oxide particles that may be formed during the heat treatment is pulverized.

In the production method according to the embodiment of the present invention, it is particularly important that nickel sulfate is used as a raw material in the step A. When nickel sulfate is used to prepare an aqueous nickel salt solution, a nickel oxide powder having a fine particle size can be obtained even at a higher heat treatment temperature as compared to when another nickel salt is used. This makes it possible to obtain a nickel oxide fine powder having a fine particle size and a controlled sulfur content. That is, the present inventors have found that the influence of heat treatment temperature on particle size can be reduced by the effect of a sulfur component, and as a result, the sulfur content of nickel oxide can be controlled by heat treatment temperature while the particle size of nickel oxide is kept fine. Further, this method does not use nickel chloride, and therefore there is no fear of chlorine contamination, which makes it possible to obtain a nickel oxide fine powder containing substantially no chlorine except for chlorine inevitably contained as an impurity in the raw material.

It is not known exactly why a nickel oxide fine powder having a fine particle size can be obtained by the above method. However, it can be considered that the decomposition temperature of nickel sulfate is as high as 848° C., and therefore the sulfur component is incorporated as a sulfate into the surface of or interface between nickel hydroxide particles, which suppresses sintering of nickel oxide particles even at a high temperature.

Hydroxyl groups in nickel hydroxide crystals are eliminated by the above-described heat treatment so that nickel oxide particles are formed. At this time, by appropriately setting the temperature of the heat treatment, the nickel oxide particles can have a fine particle size and a controlled sulfur content. More specifically, the heat treatment temperature of nickel hydroxide is set to a temperature higher than 850° C. but lower than 1050° C., preferably 860° C. to 1000° C. so that a resulting nickel oxide fine powder can have a controlled sulfur content of 400 mass ppm or less and a specific surface area of 3 $m^2/g$ or more but less than 6 $m^2/g$. Particularly, in order to control the sulfur content to be 300 mass ppm or less, 100 mass ppm or less, or 50 mass ppm or less, the heat treatment temperature of nickel hydroxide is more preferably set to 870° C. or higher, 910° C. or higher, or 950° C. or higher, respectively. In any case, a desired sulfur content can be achieved by appropriately adjusting the heat treatment temperature to a value within the above temperature range.

If the heat treatment temperature is 1050° C. or higher, the decomposition of the sulfur component proceeds so that the above-described sintering-suppressing effect becomes insufficient and sintering is significantly promoted by temperature. As a result, sintering of nickel oxide particles obtained by the heat treatment in the step B becomes significant, which makes it difficult to pulverize a sintered compact of nickel oxide particles in the step C. In this case, even when the sintered compact can be pulverized, it is impossible to obtain a nickel oxide fine powder having a fine particle size and a desired specific surface area. On the other hand, if the heat treatment temperature of nickel hydroxide is 850° C. or lower, the sulfur component such as a sulfate is not sufficiently volatilized due to its insufficient decomposition and therefore remains in nickel hydroxide. Therefore, a resulting nickel oxide fine powder has a sulfur content higher than 400 mass ppm.

Hereinbelow, each of the steps of the nickel oxide production method according to the embodiment of the present invention will be described in detail. First, the step A is a step in which, an aqueous nickel sulfate solution is neutralized, with an alkali to obtain nickel hydroxide. Concentrations, neutralization conditions, etc. may be those used in a known technique. Nickel sulfate used as a raw material is not particularly limited, but the impurity content of the raw material is preferably less than 100 mass ppm to prevent corrosion, because a resulting nickel oxide fine powder is used as a material for electronic parts or an electrode material for solid oxide fuel cells.

The alkali used for neutralization is not particularly limited, but is preferably sodium hydroxide, potassium hydroxide, or the like in view of the amount of nickel that will remain in a reaction liquid, and is particularly preferably sodium hydroxide in view of cost. Further, the alkali added to the aqueous nickel sulfate solution may be either in a solid or liquid state, but is preferably used as an aqueous solution from the viewpoint of ease of handling.

In order to obtain nickel hydroxide having uniform characteristics, a so-called double-jet method is effective, in which a previously-prepared aqueous nickel sulfate solution as an aqueous nickel salt solution and a previously-prepared aqueous alkali solution are added to a liquid sufficiently stirred in a reaction tank. That is, an effective neutralization method is not a method in which one of an aqueous alkali solution and an aqueous nickel salt solution is added to the other prepared in a reaction tank but a method in which an aqueous nickel salt solution and an aqueous alkali solution are added, preferably with stirring, concurrently and continuously in a turbulent state to a liquid sufficiently stirred in a reaction tank. In this case, the liquid previously placed in the reaction tank is preferably one prepared by adding an alkali to pure water to adjust pH to a predetermined value.

During the neutralization, the pH of the reaction liquid is preferably set to a value in the range of 8.3 to 9.0, and is particularly preferably kept almost constant in the above range. If the pH is lower than 8.3, the concentration of an anionic component such as sulfate ion remaining in nickel hydroxide is increased, which is disadvantageous because a large amount of hydrochloric acid or SOx is produced and damages a furnace during calcining in the step B. On the other hand, if the pH exceeds 9.0, resulting nickel hydroxide particles are too fine, which makes it difficult to perform subsequent filtration. Further, there is a case where sintering excessively proceeds in the subsequent step B and therefore it is difficult to obtain a nickel oxide fine powder having a fine particle size.

When the pH is 9.0 or lower that is a preferred neutralization condition in the present invention, there is a case where a nickel component slightly remains in the aqueous solution. In this case, however, nickel in a filtrate can be reduced by increasing the pH to about 10 after neutralization crystallization in the step A. The pH during neutralization is preferably controlled to be constant so that its fluctuations around a setting value are within 0.2 in absolute value. If the pH fluctuations exceed 0.2 in absolute value, there is a fear that impurities are increased or the specific surface area of a resulting nickel oxide fine powder is reduced.

Further, the concentration of nickel in the aqueous nickel sulfate solution used in the step A is not particularly limited, but is preferably 50 to 150 g/L in view of productivity. If the nickel concentration is less than 50 g/L, productivity is reduced. On the other hand, if the nickel concentration exceeds 150 g/L, the anion concentration in the aqueous solution is too high so that generated nickel hydroxide has a high sulfur content, and therefore there is a case where a finally obtained nickel oxide fine powder cannot have a sufficiently-low impurity content.

The neutralization can be performed at a commonly-used liquid temperature without any particular problem, and the liquid temperature may be room temperature. However, the liquid temperature is preferably 50 to 70° C. to sufficiently grow nickel hydroxide particles. By sufficiently growing nickel hydroxide particles, it is possible to prevent sulfur from being excessively contained in nickel hydroxide. Further, it is possible to suppress incorporation of impurities such as sodium into nickel hydroxide and therefore to finally reduce impurities contained in a resulting nickel oxide fine powder.

If the liquid temperature is less than 50° C., nickel hydroxide particles do not sufficiently grow so that sulfur and impurities incorporated into nickel hydroxide are increased. On the other hand, if the liquid temperature exceeds 70° C., water significantly evaporates so that the concentrations of sulfur and impurities in the aqueous solution are increased, and therefore there is a case where generated nickel hydroxide has high sulfur and impurity contents.

After the completion of the neutralization, deposited nickel hydroxide is collected by filtration. The collected filter cake is preferably washed before subjected to the next step B. The washing is preferably repulp washing. A washing liquid for use in the washing is preferably water, particularly preferably pure water. The mixing ratio between nickel hydroxide and water during the washing is not particularly limited as long as an anion contained in the nickel salt, especially sulfate ion, and a sodium component can be sufficiently removed.

More specifically, in order to sufficiently reduce impurities such as remaining anion and sodium component and to well disperse nickel hydroxide, 1 L, of the washing liquid is preferably mixed with 50 to 150 g of nickel hydroxide, and is more preferably mixed with about 100 g of nickel hydroxide. It is to be noted that washing time can be appropriately determined depending on treatment conditions so that remaining impurities can be sufficiently reduced. It is to be noted that when the anion and the sodium component cannot be sufficiently reduced by one washing, the filter cake is preferably washed repeatedly. Particularly, sodium cannot be removed even by heat treatment in the next step B, and is therefore preferably removed sufficiently by washing.

The next step B is a step in which nickel hydroxide obtained in the above-described step A is heat-treated to obtain nickel oxide. The heat treatment is performed in a non-reducing atmosphere at a temperature higher than 850° C. but lower than 1050° C. An atmosphere during the heat treatment is not particularly limited as long as the atmosphere is a non-reducing atmosphere, but is preferably an air atmosphere in view of economy. Further, in order to efficiently discharge water vapor generated by the elimination of hydroxyl groups during the heat treatment, the heat treatment is preferably performed in a flowing atmosphere having a sufficient flow rate. It is to be noted that the heat treatment can be performed by a commonly-used roaster.

The time of the heat treatment can be appropriately set depending on treatment conditions such as treatment temperature and throughput so that a finally-obtained nickel oxide fine powder can have a specific surface area of 3 $m^2/g$ or more but less than 6 $m^2/g$. Nickel oxide after the heat treatment has a fine particle size due to the above-described effect of the sulfur component and can be easily pulverized, and the specific surface area of a nickel oxide fine powder finally obtained by pulverizing is increased by about 1.5 to 3.5 $m^2/g$ as compared to that of the nickel oxide after the heat treatment. Therefore, the treatment conditions can be set based on the specific surface area of nickel oxide after the heat treatment. That is, the heat treatment is preferably performed under such conditions that nickel oxide before pulverizing has a specific surface area of 0.5 to 4.5 $m^2/g$. In this regard, when the heat treatment temperature is low, sintering of nickel oxide particles after the heat treatment is less likely to occur so that an increase in specific surface area due to pulverizing tends to be small, and when the heat treatment temperature is high, sintering of nickel oxide particles after the heat treatment is more likely to occur so that, when the nickel oxide particles are strongly pulverized, an increase in specific surface area due to pulverizing tends to be large. The sulfur content and specific surface area of nickel oxide can be easily controlled by setting the heat treatment temperature to a value within the above range.

The next step C is a step in which a sintered compact of nickel oxide particles that may be formed during the heat treatment in the step B is pulverized. In the step B, hydroxyl groups in nickel hydroxide crystals are eliminated so that nickel oxide particles are formed. At this time, nickel oxide particles having a fine particle size are formed, and sintering of the nickel oxide particles proceeds to some degree due to the influence of high temperature although the sulfuric acid component suppresses the sintering. In order to break the sintered compact, the nickel oxide after the heat treatment is pulverized in the step C to obtain a nickel oxide fine powder.

Examples of a general pulverizing method include a method using pulverizing media such as bead milling or ball milling and a method using no pulverizing media such as jet milling. In the production method according to the present invention, the latter pulverizing method using no pulverizing media is preferably used. This is because the use of pulverizing media makes it easy to perform pulverizing itself, but there is a fear that a component constituting pulverizing media, such as zirconia, is incorporated as an impurity. Particularly, when a resulting, nickel oxide fine powder is used as a material for electronic parts, a pulverizing method using no pulverizing media is preferably used.

When an impurity that should be reduced is only zirconium, the above fear can be addressed by performing pulverizing using pulverizing media containing no zirconium such as zirconia. However, even in this case, the use of pulverizing media is not preferred because other impurities from the pulverizing media are incorporated, and as a result, a nickel oxide fine powder having a low impurity content cannot be obtained. Further, pulverizing media containing no zirconium, e.g., pulverizing media containing no yttria-stabilized zirconia is poor in strength and abrasion resistance. Also from this viewpoint, pulverizing is preferably performed by a method using no pulverizing media.

Examples of the pulverizing method using no pulverizing media include a method in which powder particles are allowed to collide with one another, a method in which a shear force is applied to a powder with the use of a solvent such as a liquid, and a method using an impact force caused by cavitation of a solvent. Examples of a pulverizing device in which powder particles are allowed to collide with one another include a dry jet mill and a wet jet mill, and specific examples of the former include Nano Grinding Mill, (registered trademark) and Cross Jet Mill (registered trademark)

and specific examples of the latter include Altimizer (registered trademark) and Star Burst (registered trademark) An example of a pulverizing device in which a shear force is applied by a solvent includes Nanomizer (registered trademark), and an example of a pulverizing device using an impact force caused by cavitation of a solvent includes Nanomaker (registered trademark).

Among the above pulverizing methods, the method in which powder particles are allowed to collide with one another is particularly preferred because there is a low risk of impurity contamination and a relatively large pulverizing force can be obtained. By performing pulverizing without using pulverizing media in such a manner as described above, it is possible to obtain a nickel oxide fine powder having a fine particle size and containing substantially no impurities, especially zirconium, from pulverizing media.

Further, in order to prevent reagglomeration during drying performed after pulverizing, dry pulverizing is preferably performed. In the production method according to the present invention, nickel sulfate is used as a raw material, and therefore washing for chlorine removal does not need to be performed, which makes it possible perform dry pulverizing. Further, this makes it possible to omit a drying process, which is advantageous also in terms of cost.

Pulverizing conditions are not particularly limited, and a nickel oxide fine powder having a desired particle size distribution can be easily obtained by adjusting pulverizing conditions to be within normal ranges. This makes it possible to obtain a nickel oxide fine powder that has a fine particle size and excellent dispersibility and is suitable as a material for electronic parts such as ferrite parts.

A nickel oxide fine powder according to the present invention produced by the method described above has a very low chlorine content because the method does not include a step causing the incorporation of chlorine except for chlorine contained in the raw material as an impurity. In addition, the nickel oxide fine powder has a controlled sulfur content, a low sodium content, and a large specific surface area. More specifically, the nickel oxide fine powder has a sulfur content of 400 mass ppm or less, preferably 300 mass ppm or less, a chlorine content of 50 mass ppm or less, a sodium content of 100 mass ppm or less, and a specific surface area of 3 $m^2/g$ or more but less than 6 $m^2/g$. Therefore, the nickel oxide fine powder is suitable as a material for electronic parts, especially ferrite parts or an electrode material for solid oxide fuel cells. It is to be noted that when used as an electrode material for solid oxide fuel cells, the nickel oxide fine powder preferably has a sulfur content of 100 mass ppm or less.

Further, the nickel oxide fine powder production method according to the present invention does not include a step in which a group II element such as magnesium is added, and therefore a resulting nickel oxide fine powder contains substantially no group II element as an impurity. Further, when pulverizing is performed without using pulverizing media, the nickel oxide fine powder contains no zirconia, either and therefore has a zirconia content of 30 mass ppm or less and a group II element content of 30 mass ppm or less.

Further, the nickel oxide fine powder according to the present invention preferably has a D90 (particle size corresponding to 90% in a cumulative particle size distribution curve) of 2 μm or less, more preferably 0.2 to 1.8 μm as measured by a laser scattering method. It is to be noted that the D90 as measured by a laser scattering method is reduced by pulverizing when the nickel oxide fine powder is mixed with other materials to produce electronic parts or the like, but the specific surface area of the nickel oxide fine powder is less likely to be increased by such pulverizing. For this reason, it is more important that the nickel oxide fine powder itself has a large specific surface area.

Further, in the nickel oxide fine powder production method according to the present invention, nickel hydroxide produced by a wet method is heat-treated, and therefore a large amount of hazardous SOx is not produced. This makes it possible to eliminate the need for expensive equipment for removing SOx and therefore to reduce production cost.

EXAMPLES

Hereinbelow, the present invention will be described in more detail with reference to examples, but the present invention is not limited to these examples. It is to be noted that in the following examples and comparative examples, the chlorine content of a nickel oxide fine powder was analyzed by dissolving the nickel oxide fine powder in nitric acid under microwave irradiation in a closed container capable of suppressing volatilization of chlorine, adding silver nitrate thereto to precipitate silver chloride, and assaying chlorine contained in the obtained precipitate with the use of an X-ray fluorescence quantitative analyzer (Magix manufactured by PANalytical) by a calibration curve method. Further, the sulfur content of the nickel oxide fine powder was analyzed by dissolving the nickel oxide fine powder in nitric acid and analyzing the solution by an ICP emission spectrometer (SPS-3000 manufactured by Seiko Instruments Inc.). The sodium content of the nickel oxide fine powder was analyzed by dissolving the nickel oxide fine powder in nitric acid and analyzing the solution by an atomic absorption spectrometer (Z-2300 manufactured by Hitachi High-Technologies Corporation).

The particle size distribution of the nickel oxide fine powder was determined by a laser scattering method, and a particle size D90 at 90% cumulative volume was determined from the particle size distribution. Further, the analysis of specific surface area was performed by a BET method based on nitrogen gas adsorption.

Example 1

First, a 2-liter reaction tank equipped with a baffle, an overflow port, and a stirring system was filled with 2 L of an aqueous sodium hydroxide solution prepared by dissolving sodium hydroxide in pure water and adjusting the pH to 8.5, and the aqueous sodium hydroxide solution was sufficiently stirred. Then, nickel sulfate was dissolved in pure water to prepare an aqueous nickel solution having a nickel concentration of 120 g/L. Further, a 12.5 mass % aqueous sodium hydroxide solution was prepared. These aqueous nickel solution and aqueous sodium hydroxide solution were concurrently and continuously added to and mixed with the aqueous sodium hydroxide solution in the above-described reaction tank so that fluctuations in pH around pH 8.5 were within 0.2 in absolute value.

In this way, a nickel hydroxide precipitate was continuously formed and collected by overflow. It is to be noted that the aqueous nickel solution was added at a flow rate of 5 mL/min to adjust the retention time of nickel hydroxide to about 3 hours. At this time, the flow of each of the aqueous nickel solution and the aqueous sodium hydroxide solution was turbulent at the exit of a supply nozzle. The temperature of the liquid in the reaction tank was set to 60° C. and the liquid in the reaction tank was stirred by a stirring blade at 700 rpm.

A slurry collected by overflow was repeatedly subjected to nutsche filtration and repulping in pure water with a holding time of 30 minutes ten times to obtain a nickel hydroxide filter cake. This filter cake was dried using an air dryer at 110° C. in the atmosphere for 24 hours to obtain nickel hydroxide (Step A).

Five hundred grams of the obtained nickel hydroxide was supplied to an atmospheric calcining furnace and heat-treated in the atmosphere at 865° C. for 2 hours to obtain nickel oxide particles (Step B). The obtained nickel oxide particles had a specific surface area of 4.1 m$^2$/g.

Then, 300 g of the nickel oxide particles was separated from the obtained nickel oxide particles and pulverized by a nano grinding mill (manufactured by TOKUJU CORPORATION) at a pusher nozzle pressure of 1.0 MPa and a grinding pressure of 0.9 MPa to obtain a nickel oxide fine powder (Step C).

The obtained nickel oxide fine powder had a sulfur content of 370 mass ppm, a chlorine content of less than 50 mass ppm, a sodium content of less than 100 mass ppm, a specific surface area of 5.9 m$^2$/g, and a D90 of 0.28 μm.

Example 2

A nickel oxide fine powder was obtained and analyzed in the same manner as in Example 1 except that the temperature of heat treatment in Step B was changed to 875° C.

The obtained nickel oxide fine powder had a sulfur content of 250 mass ppm, a chlorine content of less than 50 mass ppm, a sodium content of less than 100 mass ppm, a specific surface area of 5.1 m$^2$/g, and a D90 of 0.42 μm.

Example 3

A nickel oxide fine powder was obtained and analyzed in the same manner as in Example 1 except that the temperature of heat treatment in Step B was changed to 900° C. The specific surface area of nickel oxide after heat treatment was 2.2 m$^2$/g.

The obtained nickel oxide fine powder had a sulfur content of 140 mass ppm, a chlorine content of less than 50 mass ppm, a sodium content of less than 100 mass ppm, a specific surface area of 4.3 m$^2$/g, and a D90 of 0.42 μm.

Example 4

A nickel oxide fine powder was obtained and analyzed in the same manner as in Example 1 except that the temperature of heat treatment in Step B was changed to 910° C.

The obtained nickel oxide fine powder had a sulfur content of 99 mass ppm, a chlorine content of less than 50 mass ppm, a sodium content of less than 100 mass ppm, a specific surface area of 4.1 m$^2$/g, and a D90 of 0.58 μm.

Example 5

A nickel oxide fine powder was obtained and analyzed in the same manner as in Example 1 except that the temperature of heat treatment in Step B was changed to 920° C.

The obtained nickel oxide fine powder had a sulfur content of 71 mass ppm, a chlorine content of less than 50 mass ppm, a sodium content of less than 100 mass ppm, a specific surface area of 3.8 m$^2$/g, and a D90 of 0.60 μm.

Example 6

A nickel oxide fine powder was obtained and analyzed in the same manner as in Example 1 except that the temperature of heat treatment in Step B was changed to 950° C. The specific surface area of nickel oxide after heat treatment was 1.1 m$^2$/g.

The obtained nickel oxide fine powder had a sulfur content of less than 50 mass ppm, a chlorine content of less than 50 mass ppm, a sodium content of less than 100 mass ppm, a specific surface area of 3.2 m$^2$/g, and a P90 of 0.85 μm.

Example 7

A nickel oxide fine powder was obtained and analyzed in the same manner as in Example 1 except that the temperature of heat treatment in Step B was changed to 1000° C. and the amount of nickel oxide particles supplied to the nano grinding mill was changed. The specific surface area of nickel oxide after heat treatment was 0.9 m$^2$/g.

The obtained nickel oxide fine powder had a sulfur content of less than 50 mass ppm, a chlorine content of less than 50 mass ppm, a sodium content of less than 100 mass ppm, a specific surface area of 3.4 m$^2$/g, and a 090 of 0.95 μm.

Example 8

A nickel oxide fine powder was obtained and analyzed in the same manner as in Example 1 except that the temperature of heat treatment in Step B was changed to 1000° C., the time of heat treatment was changed to 6 hours, and the amount of nickel oxide particles supplied to the nano grinding mill was changed. The specific surface area of nickel oxide after heat treatment was 0.8 m$^2$/g.

The obtained nickel oxide fine powder had a sulfur content of less than 50 mass ppm, a chlorine content of less than 50 mass ppm, a sodium content of less than 100 mass ppm, a specific surface area of 4.3 m$^2$/g, and a D90 of 1.34 μm.

Comparative Example 1

A nickel oxide fine powder was obtained and analyzed in the same manner as in Example 1 except that the temperature of heat treatment in Step B was changed to 850° C.

The obtained nickel oxide fine powder had a sulfur content of 670 mass ppm, a chlorine content of less than 50 mass ppm, a sodium content of less than 100 mass ppm, a specific surface area of 7.0 m$^2$/g, and a D90 of 0.37 μm.

Comparative Example 2

A nickel oxide fine powder was obtained and analyzed in the same manner as in Example 1 except that the temperature of heat treatment in Step B was changed to 1050° C.

The obtained nickel oxide fine powder had a sulfur content of less than 50 mass ppm, a chlorine content of less than 50 mass ppm, a sodium content of less than 100 mass ppm, a specific surface area of 2.5 m$^2$/g, and a D90 of 1.51 μm.

Comparative Example 3

A nickel oxide fine powder was obtained and analyzed in the same manner as in Example 1 except that the temperature of heat treatment in Step B was changed to 1200° C.

The obtained nickel oxide fine powder had a sulfur content of less than 50 mass ppm, a chlorine content of less than 50 mass ppm, a sodium content of less than 100 mass ppm, a specific surface area of 1.8 m²/g, and a D90 of 3.10 µm.

Comparative Example 4

A nickel oxide fine powder was obtained and analyzed in the same manner as in Example 1 except that nickel sulfate used in Step A was changed to nickel chloride and the temperature of heat treatment in Step B was changed to 750° C.

The obtained nickel oxide fine powder had a sulfur content of less than 50 mass ppm, a chlorine content of 240 mass ppm, a sodium content of less than 100 mass ppm, a specific surface area of 3.3 m²/g, and a 1.90 of 0.72 µm.

Comparative Example 5

A nickel oxide fine powder was obtained and analyzed in the same manner as in Example 1 except that nickel sulfate used in Step A was changed to nickel chloride and the temperature of heat treatment in Step B was changed to 900° C.

The obtained nickel oxide fine powder had a sulfur content of less than 50 mass ppm, a chlorine content of 120 mass ppm, a sodium content of less than 100 mass ppm, a specific surface area of 2.2 m²/g, and a D90 of 1.00 µm.

Comparative Example 6

A nickel oxide fine powder was obtained and analyzed in the same manner as in Example 1 except that nickel sulfate used in Step A was changed to nickel chloride and the temperature of heat treatment in Step E was changed to 950° C.

The obtained nickel oxide fine powder had a sulfur content of less than 50 mass ppm, a chlorine content of less than 50 mass ppm, a sodium content of less than 100 mass ppm, a specific surface area of 1.7 m²/g, and a D90 of 1.98 µm.

The raw material, the heat treatment conditions (roasting temperature and roasting time), and the sulfur content, chlorine content, sodium content, specific surface area, and D90 of the obtained nickel oxide fine powder of each of Examples 1 to 9 and Comparative Examples 1 to 6 are summarized in the following Table 1.

TABLE 1

| | Nickel raw material | Heat treatment conditions Temp. (° C.) | Time (hr) | Specific surface area (m²/g) | Cl (mass ppm) | S (mass ppm) | Na (mass ppm) | D90 (µm) |
|---|---|---|---|---|---|---|---|---|
| Example 1 | NiSO₄ | 865 | 2 | 5.9 | <50 | 370 | <100 | 0.28 |
| Example 2 | NiSO₄ | 875 | 2 | 5.1 | <50 | 250 | <100 | 0.42 |
| Example 3 | NiSO₄ | 900 | 2 | 4.3 | <50 | 140 | <100 | 0.42 |
| Example 4 | NiSO₄ | 910 | 2 | 4.1 | <50 | 99 | <100 | 0.58 |
| Example 5 | NiSO₄ | 920 | 2 | 3.8 | <50 | 71 | <100 | 0.60 |
| Example 6 | NiSO₄ | 950 | 2 | 3.2 | <50 | <50 | <100 | 0.85 |
| Example 7 | NiSO₄ | 1000 | 2 | 3.4 | <50 | <50 | <100 | 0.95 |
| Example 8 | NiSO₄ | 1000 | 6 | 4.3 | <50 | <50 | <100 | 1.34 |
| Comparative Example 1 | NiSO₄ | 850 | 2 | 7.0 | <50 | 670 | <100 | 0.37 |
| Comparative Example 2 | NiSO₄ | 1050 | 2 | 2.5 | <50 | <50 | <100 | 1.51 |
| Comparative Example 3 | NiSO₄ | 1200 | 2 | 1.8 | <50 | <50 | <100 | 3.10 |
| Comparative Example 4 | NiCl₂ | 750 | 2 | 3.3 | 240 | <50 | <100 | 0.72 |
| Comparative Example 5 | NiCl₂ | 900 | 2 | 2.2 | 120 | <50 | <100 | 1.00 |
| Comparative Example 6 | NiCl₂ | 950 | 2 | 1.7 | <50 | <50 | <100 | 1.98 |

As can be seen from the results shown in Table 1, in all Examples, the sulfur content was controlled to be 400 mass ppm or less, and in addition, the chlorine content was less than 50 mass ppm and the sodium content was less than 100 mass ppm. Further, the specific surface area was very large as 3.0 m²/g or more, from which it can be seen that the obtained nickel oxide fine powder had a fine particle size.

On the other hand, in Comparative Example 1 to 6, the heat treatment temperature did not meet the requirement of the present invention or nickel chloride was used as a raw material nickel salt, and therefore any one of the sulfur content, chlorine content, specific surface area, and D90 was not within a range suitable for a material for electronic parts.

The invention claimed is:
1. A nickel oxide fine powder having a specific surface area of 3 m²/g or more but less than 4.3 m²/g, a sulfur content of 140 mass ppm or less, a chlorine content of 50 mass ppm or less, and a sodium content of 100 mass ppm or less.

2. The nickel oxide fine powder according to claim 1, which has a D90 of 0.42 µm or more and 2 µm or less as measured by a laser scattering method.

* * * * *